United States Patent
Endoh

(10) Patent No.: US 7,251,211 B2
(45) Date of Patent: Jul. 31, 2007

(54) OPTICAL MEDIUM HAVING GROOVES ALONG RECORDING TRACKS, AND AN ASSOCIATED MASTER DISC AND APPARATUS

(75) Inventor: Sohmei Endoh, Miyagi (JP)

(73) Assignee: Sony Corporation, Tokyo (JP)

( * ) Notice: Subject to any disclaimer, the term of this patent is extended or adjusted under 35 U.S.C. 154(b) by 721 days.

(21) Appl. No.: 10/478,055

(22) PCT Filed: Mar. 10, 2003

(86) PCT No.: PCT/JP03/02781

§ 371 (c)(1),
(2), (4) Date: Nov. 18, 2003

(87) PCT Pub. No.: WO03/079340

PCT Pub. Date: Sep. 25, 2003

(65) Prior Publication Data

US 2004/0151106 A1    Aug. 5, 2004

(30) Foreign Application Priority Data

Mar. 19, 2002    (JP) ............................. 2002-076848

(51) Int. Cl.
*G11B 7/24* (2006.01)
(52) U.S. Cl. .................................. 369/275.4
(58) Field of Classification Search ............. 369/275.4
See application file for complete search history.

(56) References Cited

U.S. PATENT DOCUMENTS 6,731,589 B2 * 5/2004 Sakamoto et al. ....... 369/275.4
2004/0151106 A1    8/2004 Endoh

FOREIGN PATENT DOCUMENTS

JP    5-282671    10/1993
JP    11-259909    9/1999

OTHER PUBLICATIONS

U.S. Appl. No. 10/478,055, filed Nov. 18, 2003, Endoh.
U.S. Appl. No. 10/845,112, filed May 14, 2004, Endoh et al.
U.S. Appl. No. 10/508,089, filed Sep. 16, 2004, Endoh.

* cited by examiner

*Primary Examiner*—Paul Huber
(74) *Attorney, Agent, or Firm*—Oblon, Spivak, McClelland, Maier & Neustadt, P.C.

(57) ABSTRACT

An optical recording and reproducing medium has grooves formed thereon along recording tracks, this optical recording and reproducing medium being recorded and/or reproduced with irradiation of light having a predetermined wavelength $\lambda$. Since the grooves are composed of a first groove 2 and a second groove 3 shallower than the first groove 2 and the second groove 3 is disposed adjacent to both sides of the first groove 2, a recorded signal can be suppressed from crossing the tracks and a sufficiently large amplitude amount of a push-pull signal can be obtained. Thus, an optical recording and reproducing medium can produce a stable tracking signal and hence a recording density can be increased.

11 Claims, 6 Drawing Sheets

OPTICAL MEDIUM HAVING GROOVES ALONG RECORDING TRACKS, AND AN ASSOCIATED MASTER DISC AND APPARATUS

TECHNICAL FIELD

The present invention relates to an optical recording and reproducing medium having grooves formed thereon along recording tracks and which is recorded and/or reproduced with irradiation of light having a predetermined wavelength, an optical recording and reproducing medium manufacturing master disc for use in manufacturing this optical recording and reproducing medium and an optical recording and reproducing apparatus using this optical recording and reproducing medium, and particularly to an optical recording and reproducing medium, an optical recording and reproducing medium manufacturing master disc and an optical recording and reproducing apparatus suitable for use with optical recording mediums such as an optical disc and a magneto-optical disc with a high recording density.

BACKGROUND ART

Various disk-like optical discs that can optically be recorded and/or reproduced have been so far put into practical use as an optical recording and reproducing medium. A read-only optical disc in which embossed pits corresponding to data are formed on a disc substrate in advance, a magneto-optical disc capable of recording data thereon by utilizing a magneto-optical effect and a phase-change type optical disc capable of recording data by utilizing a phase change of a recording film are available as such optical discs.

There have hitherto been proposed read-only optical discs such as a CD (Compact disc), an LD (Laser Disc) and a DVD (Digital Versatile Disc)-ROM (Read Only Memory), a DVD+RW or DVD-RW (registered trademarks of optical discs) such as a rewritable type MD (Mini Disc) of a magneto-optical disc in which discrete information patterns or tracking guide grooves, i.e., grooves are formed in advance as preformatted patterns and various kinds of optical recording and reproducing mediums such as MO and MD Data2 (registered trademarks of magneto-optical discs: Sony Corporation) of magneto-optical discs.

Grooves are generally formed along recording tracks in order to carry out mainly tracking servo, and an opening end between the grooves is generally referred to as a "land".

Then, the optical recording and reproducing medium having grooves formed thereon is controlled in tracking servo by a tracking error signal based on a push-pull signal obtained from light that had been reflected and diffracted on the grooves. The push-pull signal can be obtained in such a manner that outputs from a plurality of photo-detectors disposed symmetrically with respect to the center of the track are calculated by predetermined equations after light reflected and diffracted on the grooves had been detected by the photo-detectors.

These optical discs had increased a recording density so far by increasing a reproducing resolution of an optical pickup mounted on a reproducing apparatus, i.e., optical system on which light for reproducing an optical disc becomes incident. Then, the reproducing resolution of the optical pickup had been so far optically realized by shortening a wavelength λ of laser light mainly used to reproduce data or by increasing a numerical aperture NA of an objective lens for focusing laser light on the optical disc.

In various kinds of optical recording mediums such as CD, MD, DVD-ROM, DVD+RW, MD Data2, the wavelengths λ of reproducing laser light, the numerical apertures NA and the track pitches Tp are shown on the following table 1. A study of this table reveals that the wavelength λ of the reproducing laser light was shortened and the numerical aperture NA of the reproducing lens was increased so that the track pitch could be reduced to achieve a high recording density.

TABLE 1

|  | Laser wavelength λ [nm] | Numerical aperture NA | λ/2NA | Track pitch [nm] |
| --- | --- | --- | --- | --- |
| CD, MD | 780 | 0.45 | 867 | 1600 |
| DVD – ROM | 650 | 0.60 | 542 | 740 |
| DVD + RW | 650 | 0.60 | 542 | 800 |
| MD Data2 | 650 | 0.52 | 625 | 950 |

A lower limit of the track pitch is selected in response to a cut-off frequency of the optical pickup of the reproducing apparatus and 2NA/λ. In actual practice, the lower limit of the track pitch is selected in a range of from approximately twice to 3/2 times the track pitch corresponding to 2NA/λ. The reason for this is to obtain a tracking reproducing signal with amplitude large enough to carry out stable tracking servo.

The high recording density optical disc such as DVD+RW and MD Data2 uses the push-pull signal as the tracking reproducing signal in recent years. Under existing circumstances, a push-pull signal amplitude value (Peak-to-Peak value) large enough to carry out stable tracking servo is higher than approximately 0.15.

As FIG. 8, which is a plan view, shows schematically an arrangement of the MD Data2, for example, double spiral grooves of ordinary groove (straight groove) 81 and a wobbling groove 82 are formed in such a manner that a track pitch Tp is 0.95 μm and that a track period Td serving as a period between the grooves is 1.90 μm. Land portions between the two grooves are formed as tracks 83 and 84 and thereby used as recording areas. The push-pull signal amplitude amount is approximately 0.30 to produce a sufficient signal amplitude amount so that the stable tracking servo characteristics can be realized.

In recent years, when a storage capacity of an optical disc further increases or a recording density of an optical disc further increases to miniaturize the optical disc, there has been proposed a so-called land-groove recording system in which recording areas are formed on both of the groove and the land. When the track pitch is 1.00 μm, the push-pull signal amplitude amount is approximately 0.48, and hence the stable tracking servo characteristic can be obtained.

However, when the recording areas are formed on both of the land and the groove, since only the side surface of the groove serves as an area in which data cannot be recorded, if the widths of the land and the groove themselves are reduced, then the side surface of this groove also is reduced in width and hence a cross-talk occurs in the adjacent recording areas. Then, a problem arises, in which the recording density of the optical disc cannot be increased more than a certain recording density.

Accordingly, the track pitch cannot be narrowed more than a certain degree substantially, i.e., a track pitch cannot be made close to a track pitch corresponding to a cut-off frequency that is determined by the wavelength λ of the reproducing laser light and the numerical aperture NA of the optical pickup.

In view of the aforesaid aspect, it is an object of the present invention to provide an optical recording and reproducing medium having an arrangement using a land-groove recording system in which a track pitch can be narrowed while suppressing a recorded signal from crossing the tracks of the land portion and the groove portion and which can stably produce a sufficiently large amplitude amount of a push-pull signal, an optical recording and reproducing medium manufacturing master disc for use in manufacturing this optical recording and reproducing medium and an optical recording and reproducing apparatus using this optical recording and reproducing medium.

DISCLOSURE OF THE INVENTION

According to the present invention, there is provided an optical recording and reproducing medium having grooves formed thereon along recording tracks and which is recorded and/or reproduced with irradiation of light having a predetermined wavelength λ. This optical recording and reproducing medium has an arrangement in which the grooves are composed of a first groove and a second groove shallower than the first groove and in which the second groove is disposed adjacent to both sides of the first groove.

Further, according to the present invention, there is provided an optical recording and reproducing medium manufacturing master disc used to manufacture an optical recording and reproducing medium having grooves formed thereon along recording tracks and which is recorded and/or reproduced with irradiation of light having a predetermined wavelength λ. In this optical recording and reproducing medium manufacturing master disc, the groove pattern corresponding to the groove of the optical recording and reproducing medium is composed of a first groove pattern corresponding to the first groove and a second groove pattern corresponding to the second groove shallower than the first groove and the second groove pattern is disposed adjacent to both sides of the first groove pattern.

Furthermore, according to the present invention, there is provided an optical recording and reproducing apparatus using the optical recording and reproducing medium having the above arrangement, i.e., the optical recording and reproducing medium having grooves formed thereon along recording tracks and which is recorded and/or reproduced with irradiation of light having a predetermined wavelength λ. This optical recording and reproducing apparatus uses the optical recording and reproducing medium in which the grooves of the optical recording and reproducing medium are composed of a first groove and a second groove shallower than the first groove and in which the second groove is disposed adjacent to both sides of the first groove.

As described above, since the optical recording and reproducing medium includes the first and second grooves and has the arrangement in which the relatively shallow second groove is provided adjacent to both sides of the relatively deep first groove, there could be obtained a sufficiently large amplitude amount of a push-pull signal.

In particular, when n assumes a refractive index of a medium extending from a light incident surface of the optical recording and reproducing medium to the first and second grooves, if phase depths $x_1$ and $x_2$ of the first and second grooves are respectively set so as to satisfy the following equations:

$$\lambda/32n \leq x_1 \leq \lambda/3.23n$$

$$x_2 < x_1$$

then a sufficiently large amount of a push-pull signal could be obtained so that satisfactory tracking servo characteristics could be obtained.

Therefore, since the widths of the land and the first groove, both of which serve as the recording areas, can be reduced, it is possible to provide the optical recording and reproducing medium, the optical recording and reproducing medium manufacturing master disc and the optical recording and reproducing apparatus capable of high-density recording to satisfy the stable tracking servo and the stable recording and reproducing characteristics.

BEST MODE FOR CARRYING OUT THE INVENTION

A preferred embodiment of the present invention will be described in detail with reference to the drawings. It is needless to say that the present invention is not limited to the following inventive examples and that the present invention may be modified and changed variously.

Figure 1:
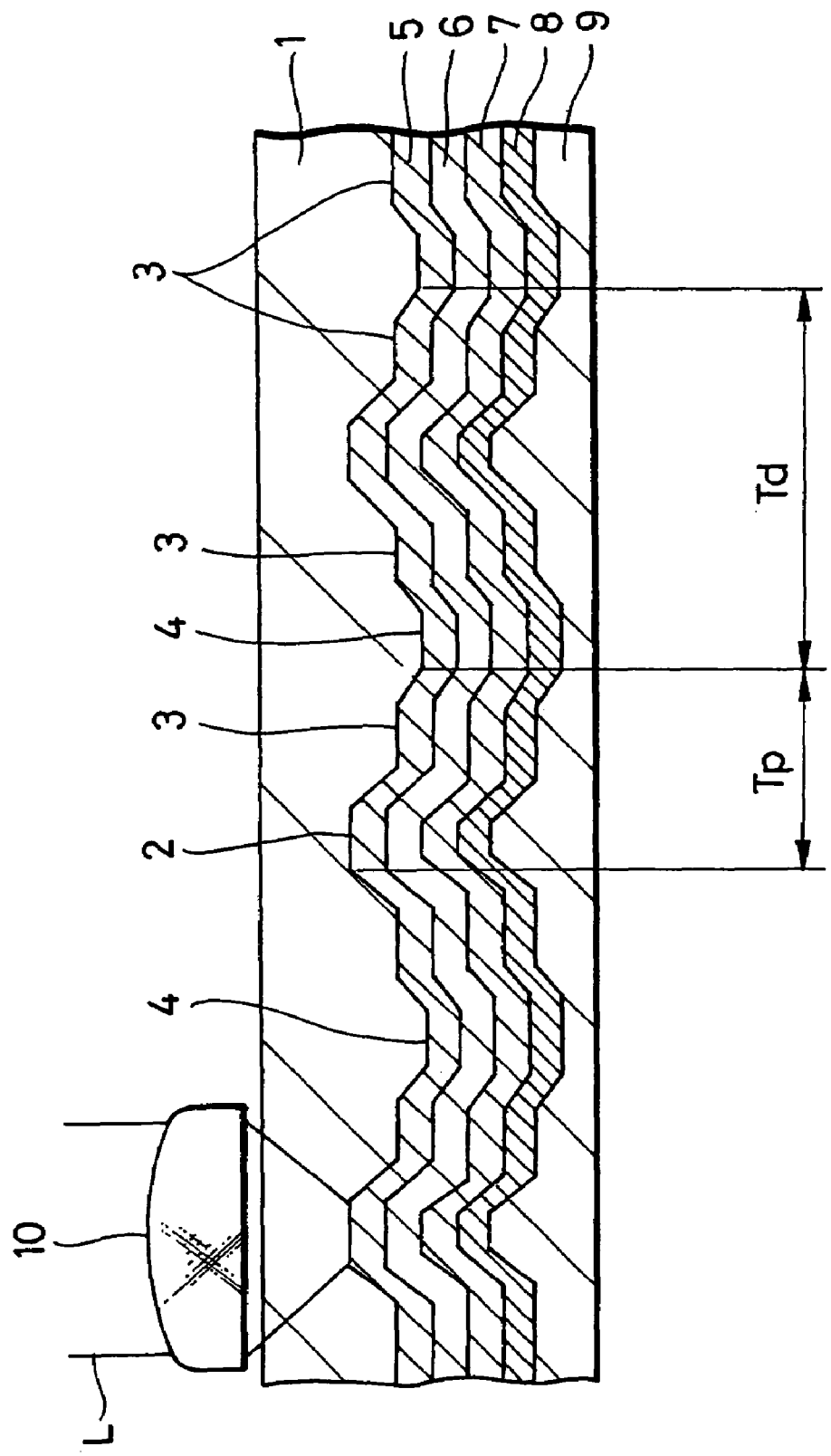
FIG. 1 is a schematic cross-sectional view showing a main portion of an example of an optical recording and reproducing medium in an enlarged-scale.

FIG. 1 is a schematic cross-sectional view showing an arrangement of an example of an optical recording and reproducing medium according to the present invention and illustrates the manner in which light is irradiated on this optical recording and reproducing medium. In FIG. 1, reference numeral 1 designates a substrate made of a suitable material such as PC (polycarbonate). Reference numeral 2 designates a first groove formed on this substrate. Reference numeral 3 designates a second groove that is disposed adjacent to both sides of the first groove, the second groove being made shallower than the first groove. Reference numeral 4 designates a land sandwiched between the second grooves. The optical recording and reproducing medium is constructed by depositing on this substrate 1 a dielectric layer 5, a recording layer 6 made of a suitable material such as a magneto-optical material and a phase-change material, a dielectric layer 7, a reflecting layer 8 made of a suitable material such as Al and a protective layer 9 made of a suitable material such as a ultraviolet-curing resin, in that order.

The example of FIG. 1 shows an example in which light is irradiated on the substrate 1 from the rear surface side, i.e., on the side opposite to the surface in which the recording layer or the like is formed by an optical pickup 10 of an optical system that records and/or reproduces, e.g. reproduces the optical recording and reproducing medium, i.e., objective lens, for example. In FIG. 1, reference letter Tp designates a track pitch. This example shows the example in which recording areas are formed on the bottom portion of the first groove 2 and the land 4, and the track pitch is selected to be a period during which the first groove 2 and the land 4 are formed. Reference letter Td designates a track period that is a period of a first groove 41.

In this arrangement, when n assumes a refractive index of a medium extending from, in particular, the light incident surface to the first and second grooves, i.e., a refractive index of the substrate 1 in the above-mentioned example of FIG. 1, if phase depths $x_1$ and $x_2$ of the first and second grooves are respectively set so as to satisfy the following equations:

$$\lambda/32n \leq x_1 \leq \lambda/3.23n$$

$$x_2 \leq x_1$$

then as will be described in the embodiment of the later stage in detail, a sufficient push-pull signal amplitude amount could be obtained, the tracking servo could be carried out stably and the recording and reproducing characteristics could be held satisfactorily.

An example of a manufacturing process of the optical recording and reproducing medium according to the present invention will be described with reference to manufacturing process diagrams of an optical recording and reproducing medium manufacturing master disc of FIGS. 2A to 2C.

Figure 2A:
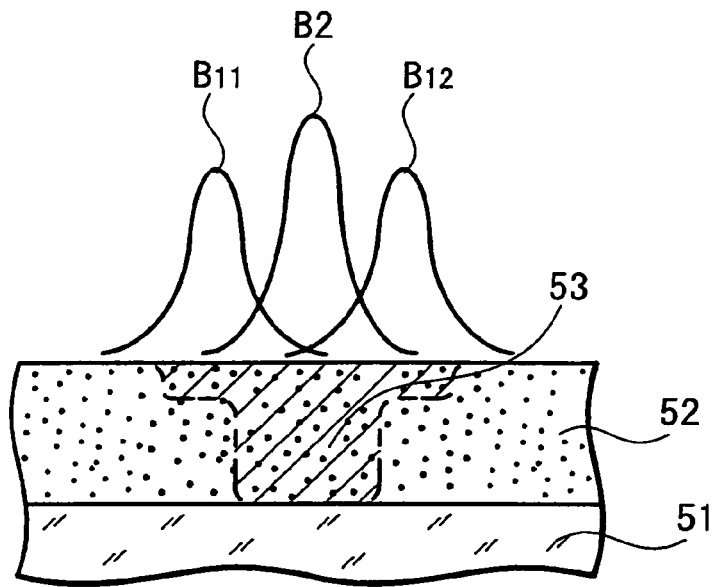
FIGS. 2A, 2B and 2C are diagrams to which reference will be made in explaining a manufacturing process of an example of the optical recording and reproducing medium.
Figure 2B:
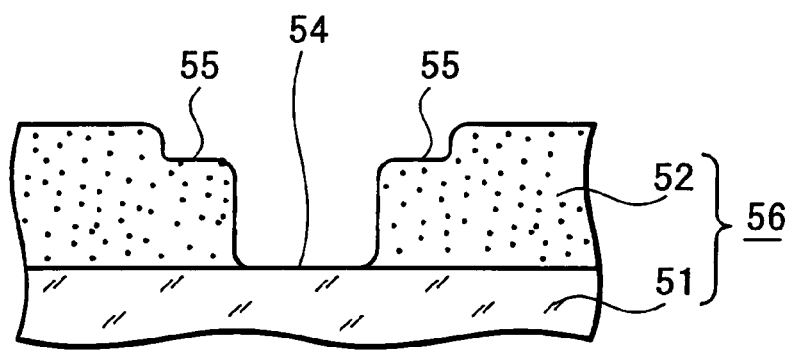

In FIG. 2A, reference numeral 51 designates a master disc substrate made of a suitable material such as glass. A photosensitive layer 52 made of a suitable material such as a photo-resist is deposited on the surface of this master disc substrate 51. As FIG. 2A schematically shows intensity distributions of exposure light B2 corresponding to the first groove and exposure lights $B_{11}$ and $B_{12}$ corresponding to the second grooves adjacent to both sides of the first groove, a latent image 53 having a step-like shape corresponding to the first and second groove patterns is formed by a predetermined pattern exposure such that spots of exposure lights may overlap partly. In FIG. 2A, the latent image 53 is shown hatched.

Then, a predetermined developing solution is coated on or immersed on the resultant product to develop the resultant product. As shown in FIG. 2B, first and second groove patterns 54 and 55 corresponding to the first and second grooves are formed on the photosensitive layer 52 formed on the master disc substrate 51 and hence an optical recording and reproducing medium manufacturing master disc 56 can be obtained.

In this optical recording and reproducing medium manufacturing master disc 56, when λ assumes a wavelength of light that reproduces the optical recording and reproducing medium and n assumes the refractive index of the substrate 1, phase depths $x_1'$ and $x_2'$ of the respective groove patterns 54 and 55 formed on the optical recording and reproducing medium manufacturing master disc 56 are respectively set so as to satisfy the following equations:

$$\lambda/32n \leq x_1' \leq \lambda/3.23n$$

$$x_2' < x_1'.$$

Figure 2C:
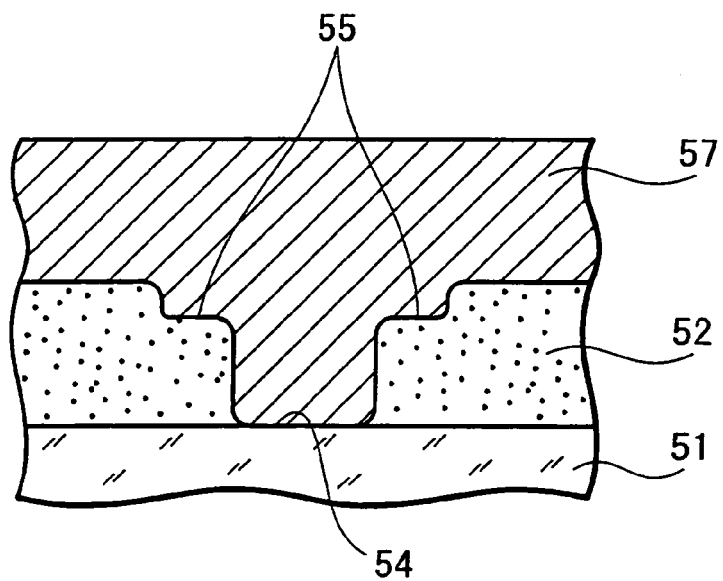

Then, after a conductive film formed of a suitable film such as a nickel coated film had been coated on the whole surface of the thus patterned photosensitive layer 52 by a suitable method such as non electrolytic plating, a plated layer made of a suitable material such as Ni and which has a thickness ranging from 300 ±5 μm is formed on the conductive film layer by electroplating in which the master disc substrate 51 with the conductive film deposited thereon is attached to an electroforming apparatus, thereby forming a stamper 57 suitable for manufacturing the optical recording and reproducing medium made of this plated layer as shown in FIG. 2C. Thereafter, although not shown, the plated layer is released from the master disc substrate 51 by a suitable means such as a cutter and the photosensitive layer deposited on the surface of the master disc substrate is rinsed and removed by a suitable solution such as acetone, thereby obtaining the stamper that is used to manufacture the optical recording and reproducing medium having the arrangement of the present invention.

Figure 3:
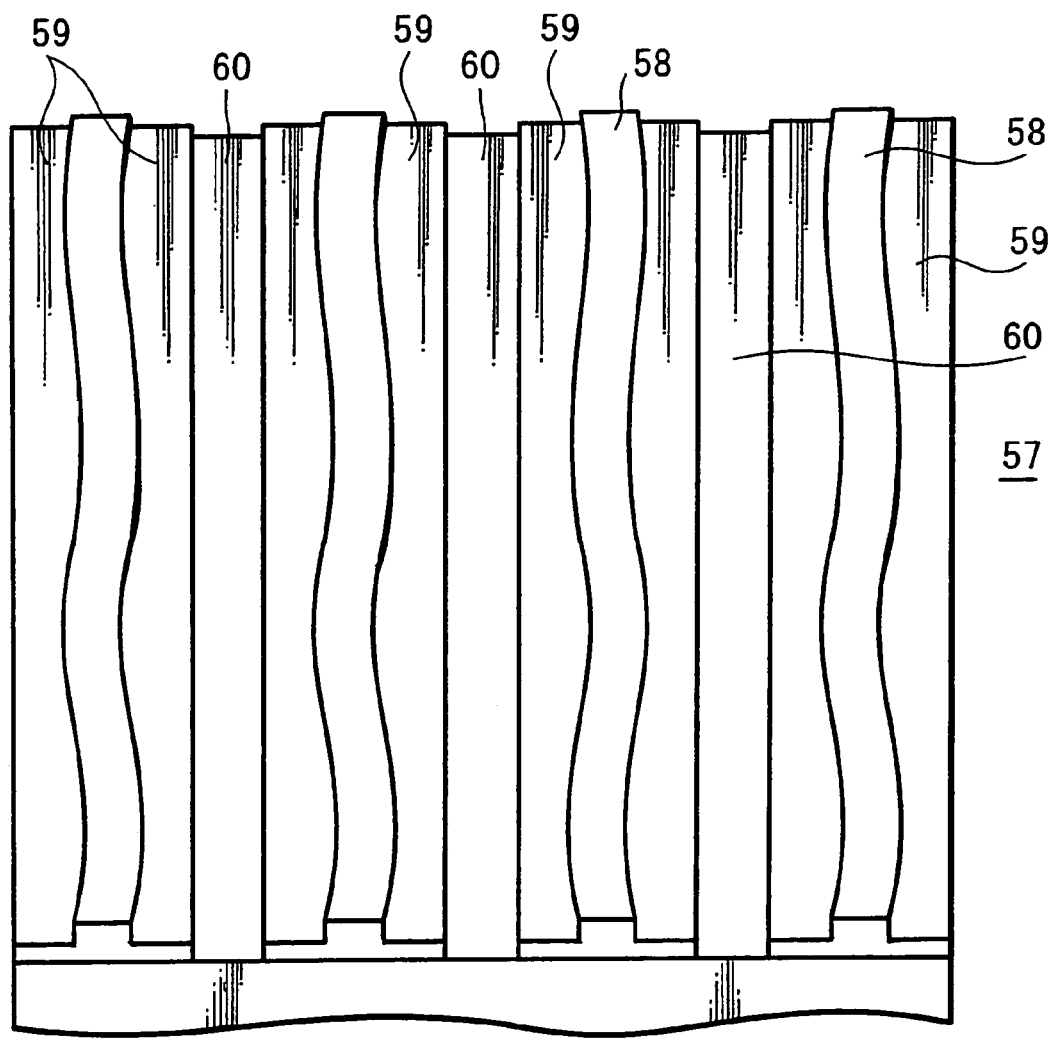
FIG. 3 is a plan view useful for explaining an arrangement of an example of a stamper that is used to manufacture an optical recording and reproducing medium.

FIG. 3 is a plan view schematically showing an arrangement of an example of this stamper 57. This example shows an example in which the first groove is formed as a wobbling groove. Reference numeral 58 designates a first groove pattern, reference numeral 59 designates a second groove pattern disposed adjacent to both sides of the first groove pattern and reference numeral 60 designates a land pattern sandwiched between the respective second groove patterns, respectively.

As described above, in the arrangement of the present invention, there are provided the first groove pattern corresponding to the relatively deep first groove and the second groove pattern corresponding to the relatively shallow second grooves disposed adjacent to both sides of the first groove pattern. With the above-mentioned arrangement, when the substrate is molded from this stamper 57 by a suitable method such as injection molding or 2P (Photo-Polymerization), satisfactory concave and convex shapes could be held on the molded substrate as compared with the case in which a stamper having only deep grooves is in use.

Figure 4:
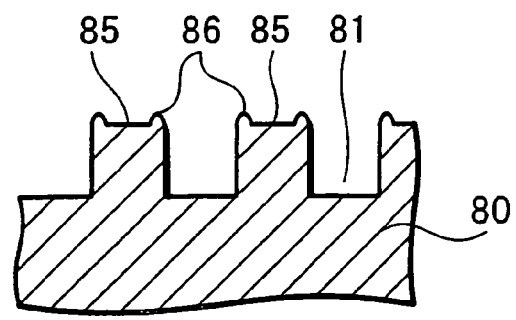
FIG. 4 is a diagram to which reference will be made in explaining a protrusion produced in a land.

This will be described below. FIG. 4 is a cross-sectional view showing an arrangement of a concave and convex pattern formed on the surface of the substrate of an example of the optical recording and reproducing medium. As illustrated, when a groove 81 on a substrate 80 is relatively deep, there arises a problem in which edges, i.e., land protrusions (protrusions) 86 are produced on two corner portions of the land 85. The reason for this will be described below. In a stamper having a concave and convex pattern opposite to the concave and convex pattern of the photosensitive layer formed on the master disc, it is unavoidable that the resin filled into the convex portions corresponding to the patterns of the land 85 are deformed when they are released from the stamper.

In the stamper produced from the master disc of the optical recording and reproducing medium having the above-mentioned arrangement of the present invention, since the relatively shallow second grooves are formed at both sides of the deep first groove, it is possible to suppress such land protrusions from being produced.

A specific exposure process of the master disc that is used to manufacture the optical recording and reproducing medium which had been described with reference to FIG. 2A will be described in detail with reference to FIG. 5 in conjunction with the example of the arrangement of the optical recording apparatus.

First, an arrangement of this optical recording apparatus will be described.

In the above-mentioned pattern exposure process, it is customary to expose the photosensitive layer such as a photo-resist on the master disc substrate by using the objective lens to focus laser beams on the photosensitive layer. FIG. 5 shows an example of such optical recording apparatus.

Figure 5:
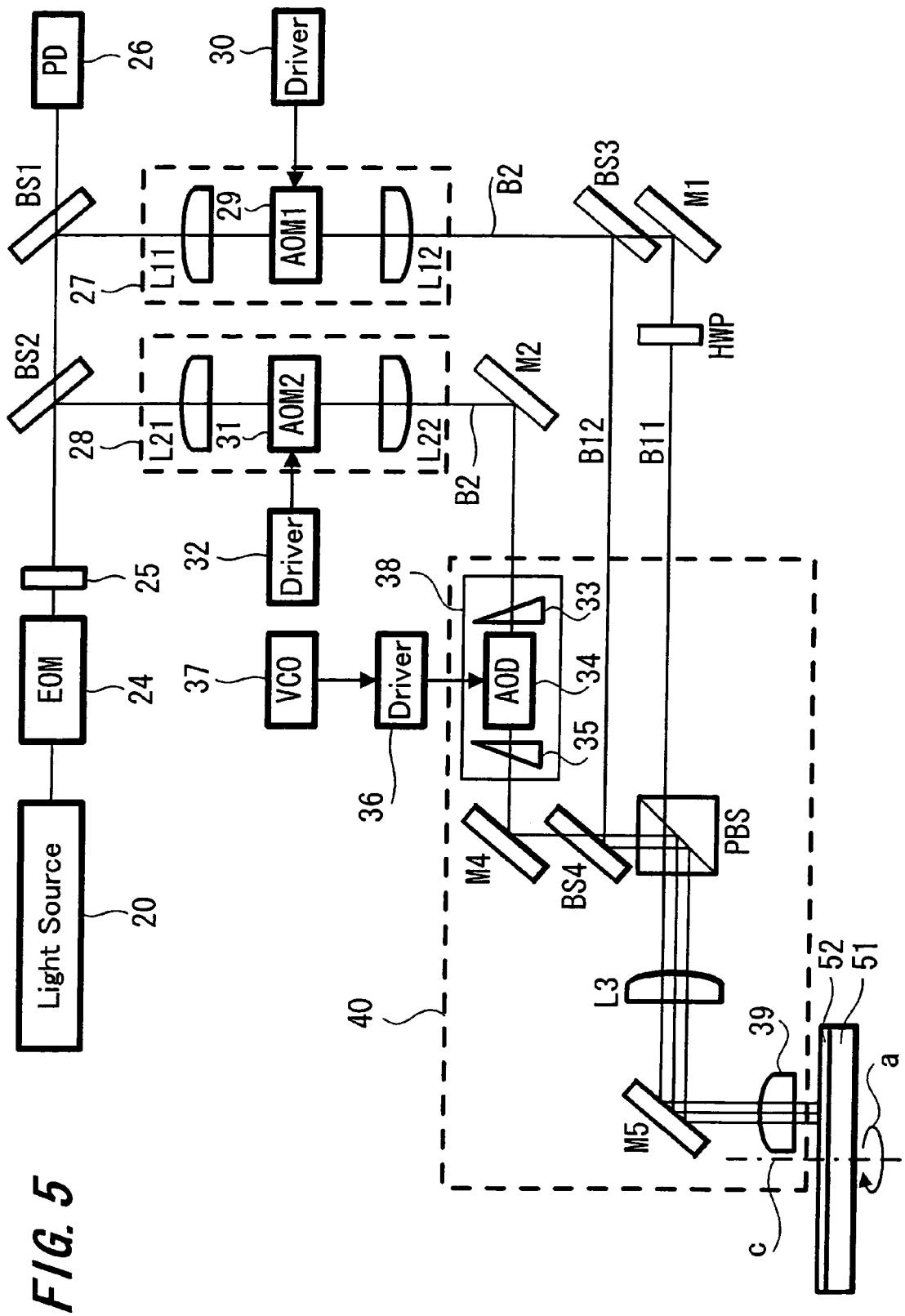
FIG. 5 is a block diagram showing an arrangement of an example of an optical recording apparatus.

In FIG. 5, reference numeral 20 designates a light source such as a gas laser. A light source is not limited to a particular light source and any light source may be selected properly when in use. In this example, there was used a laser light source that emits recording laser light of Kr laser (wavelength $\lambda=351$ nm).

The laser light emitted from this laser light source is passed through an electrooptic modulator (Electro-Optical Modulator: EOM) 24 and an analyzer 25 for passing therethrough S-polarized light, and then it is partly reflected by a beam splitter BS2. The laser light passed through the beam splitter BS2 is again partly reflected by a beam splitter BS1, and the laser light passed through this beam splitter BS1 is detected by a photo-detector (PD) 26. Although not shown, the laser beam is modulated in intensity by an applied signal electric field V applied to the electrooptic modulator 24 and is treated by automatic power control (APC) such that its light output, i.e., the output of the photo-detector 26 may become constant.

First and second laser beams B1 and B2 in which laser beams whose intensity of light output was made constant under control are reflected by the beam splitters BS1 and BS2 are respectively introduced into first and second modulating units 27 and 28. In the first and second modulating sections 27 and 28, the laser lights B1 and B2 are converged by lenses L11 and L21, and an AO modulator 29 (AOM1) and an AO modulator 31 (AOM2), each of which is comprised of an AOM (Acousto-Optic Modulator: acoustooptic modulator), are disposed on the focal surfaces of these lenses.

Ultrasonic waves corresponding to the recording signal are inputted to these AO modulators 29 and 31 from drivers 30 and 32. The laser beams are modulated in intensity based upon the ultrasonic waves and are further diffracted by the diffraction gratings of the AO modulators 29 and 31. Of the diffracted lights, only first-order diffracted light is allowed to pass through the slits.

The first-order diffracted light that had been modulated in intensity is converged by the lenses L12 and L22. The laser beam B1 outputted from the first modulating unit 27 is partly reflected by a beam splitter BS3. After a 1-1th laser beam $B_{11}$ that had been passed through this beam splitter BS3 is reflected by a mirror M1 so that its traveling direction was diffracted 90°, it is passed through a half-wave plate HWP and introduced into a moving optical table 40 horizontally in the direction extending along the optical axis. A 1-2th laser beam $B_{12}$ that had been reflected by the beam splitter BS3 is diffracted 90° in its traveling direction and is then introduced into the moving optical table 40 horizontally in the direction extending along the optical axis.

The laser beam B2 outputted from the second modulating unit 28 also is diffracted 90° in its traveling direction by the mirror M2 and is then introduced into the moving optical table 40 horizontally in the direction extending along the optical axis.

The 1-1th laser beam $B_{11}$ introduced into the moving optical table 40 is converted into P-polarized parallel beam by the half-wave plate HWP and is passed through the polarizing beam splitter PBS. On the other hand, the 1-2th laser beam $B_{12}$ is reflected by a beam splitter BS4, it is further reflected by the polarizing beam splitter PBS and is introduced in parallel to the 1-1th laser beam with a predetermined space between it and the 1-1th laser beam.

On the other hand, after the second laser beam B2 had been optically deflected by the deflection optical system 38 on the moving optical table 40, it is reflected by the mirror M4 so that its traveling direction is again diffracted 90°, it is passed through the beam splitter BS4 and is introduced into the polarizing beam splitter PBS, where it is reflected and introduced into the 1-1th and 1-2th laser beams in parallel to the 1-1th and 1-2th laser beams.

After the laser beams $B_{11}$, $B_{12}$ and B2 whose traveling directions were again diffracted 90° by the polarizing beam splitter PBS had been magnified to have predetermined beam diameters by a magnifying lens L3, they are reflected by the mirror M5 and thereby introduced into the objective lens 39. Then, they are focused to the photosensitive layer 52 on the master disc substrate 51 by this objective lens 39. Specifically, the magnifying lens L3 changes the effective numerical aperture NA relative to the objective lens to reduce the diameter of the beam spot of the exposure beam that is focused on the surface of the photosensitive layer 52 by the objective lens 39.

The master disc substrate 51 is rotated by a rotation driving means, not shown, as shown by an arrow a. A dot-and-dash line c designates a central axis of the substrate 51. Then, the laser beams $B_{11}$, $B_{12}$ and B2 are moved in the parallel direction by the moving optical table 40, whereby a latent image corresponding to concave and convex patterns that had been produced in response to the trajectory along which the laser light is irradiated on the substrate is formed on the whole surface of the photosensitive layer 52.

The deflection optical system 38 is comprised of the wedge prism 33, the acoustooptic deflector (AOD: Acousto Optical Deflector) 34 and the wedge prism 35. The laser beam B2 is introduced through the wedge prism 33 into the acoustooptic deflector 34, and this acoustooptic deflector 34 optically deflects the inputted laser beam in response to a desired exposure pattern.

An acoustooptic element made of tellurium oxide ($TeO_2$) for example, may be suitable for use as this acoustooptic deflector 34. The laser beam B2 that had been optically deflected by the acoustooptic deflector 34 is emitted through the wedge prism 35 from the deflection optical system 38. These wedge prisms 33, 35 and the acoustooptic deflector 34 are disposed in such a manner that the lattice surface of the acoustooptic element of the acoustooptic deflector 34 may satisfy the Bragg condition relative to the laser beam B2 and that the height of the laser beam emitted from the deflection optical system 38 can be prevented from being changed in the horizontal direction.

The acoustooptic deflector 34 has attached thereto a driving driver 36 to drive this acoustooptic deflector 34. A high-frequency signal from the voltage-controlled oscillator (VCO: Voltage Controlled Oscillator) 37 is modulated by sine waves and supplied to the driving driver 36. Then, when the photosensitive layer is exposed, a signal corresponding to a desired exposure pattern is inputted from the voltage-controlled oscillator 37 to the driving driver 36, whereby the laser beam B2 is optically deflected in response to a desired wobbling signal.

When pits are formed in the inner peripheral portion of the outside of the recording area, for example, in order to manufacture the optical recording and reproducing medium, the second laser beam B2 is not optically deflected but is reflected by the mirror M4 and introduced into the polarizing beam splitter PBS, in which a target pit pattern can be formed by inputting an ON/OFF signal corresponding to a predetermined pattern from the above-mentioned driver 36, for example.

By way of example, as the wobbling signal, a high-frequency signal having a center frequency of 224 MHz from the voltage-controlled oscillator 37 is frequency-modulated by a control signal (address information of 84.6 kHz: FM-modulation) from the terminal and supplied to the acoustooptic deflector 34. In the acoustooptic deflector 34, a Bragg angle is changed by the control signal supplied from the terminal, and hence the signal having the frequency of 84.6 kHz becomes able to record wobble information of address.

The first groove 2 in which an ADIP (Address In Pregroove) signal was recorded is formed on the photosensitive layer 52 by pattern exposure produced by the second laser beam B2 thus deflected by the above-mentioned method.

On the other hand, the directions of the beam splitter BS4 and the polarizing beam splitter PBS are adjusted such that the 1-1th and 1-2th laser beams $B_{11}$ and $B_{12}$ may be located adjacent to both sides of the second laser beam B2 thus deflected by the wobbling signal. Then, exposure is carried out such that the exposed portion may partly overlap the laser beam B2. A method of making the depth of the relatively shallow second groove become constant by the 1-1th and 1-2th laser beams $B_{11}$ and $B_{12}$ can be realized when recording power of each beam can be made constant by properly selecting reflectances (transmittances) of the beam splitters BS3 and BS4. The change of the depth of the relatively deep first groove can be controlled with high accuracy by changing the thickness of the photosensitive layer 52 to control recording power so that the whole thickness of this photosensitive layer 52 may be exposed.

INVENTIVE EXAMPLES

The optical recording and reproducing medium manufacturing master disc having the arrangement according to the present invention was manufactured by the above-mentioned optical recording apparatus. In the following inventive examples, the focal length of the magnifying lens L3 was selected to be 80 mm and the numerical aperture NA of the objective lens 39 was selected to be 0.9. Tellurium oxide was used as the AOM1 and AOM2 of the acoustooptic modulators 29 and 31. The signal supplied from the input terminal through the drivers 30 and 32 is a DC (direct current) signal of a constant level when the grooves are formed. In this inventive example, with respect to the optical lenses of the modulation optical systems 27 and 28, the focal lengths of the condenser lenses L11 and L21 were selected to be 80 mm and the focal lengths of the collimator lenses L12 and L22 were selected to be 100 mm.

The exposure conditions in the optical recording apparatus having the above-mentioned arrangement were such that a linear velocity was selected to be approximately 2.0 m/s, a feed pitch (i.e., track period in FIG. 1) was selected to be 1.00 μm, laser power was selected to be approximately 0.35 mW in order to record the relatively shallow second groove and that laser power was selected to be 0.5 mW in order to record the relatively deep first groove.

Subsequently, this master disc substrate 51 was held on the turntable of a developer such that the photosensitive layer 52 is faced to the upper direction, and was rotated such that the surface of this master disc substrate 51 becomes the horizontal plane. In this state, a developing solution was dropped on the photosensitive layer 52 and the photosensitive layer 52 was developed, whereby convex and concave patterns based on the recording signal were formed on the signal forming area and the optical recording and reproducing medium manufacturing master disc, which had been described with reference to FIG. 2B, was formed.

Thereafter, an optical recording and reproducing medium manufacturing stamper in which concave and convex patterns of the opposite concave and convex patterns produced by the pattern exposure and the development process in the above-mentioned optical recording apparatus are formed was formed by the manufacturing process that had been described with reference to FIG. 2C. Specifically, a conductive film made of a nickel coated film was formed by a suitable method such as nonelectrolytic plating, the optical recording and reproducing medium manufacturing master disc with the conductive film thereon was attached to the electroforming apparatus, a nickel-plated layer having a thickness ranging from 300±5 μm was formed on the conductive film by electroplating, the plated layer was released from the master disc by a suitable means such as a cutter and the photosensitive layer that is remaining on the signal forming surface was rinsed and removed by a suitable solution such as acetone, thereby the stamper being manufactured.

Figure 6:
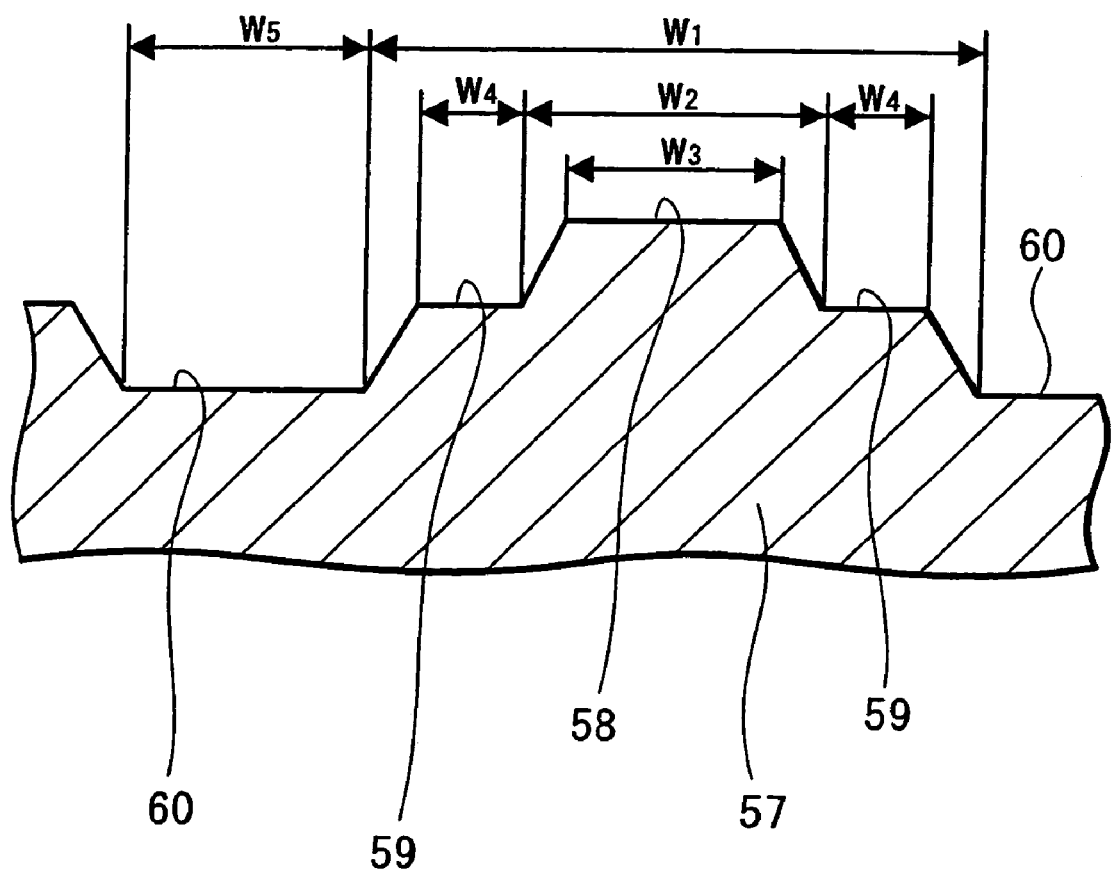
FIG. 6 is a schematic cross-sectional view showing a main portion of an example of an optical recording and reproducing medium in an enlarged-scale.

With respect to this stamper, the widths and depths (heights) of the first and second groove patterns corresponding to the first and second grooves were measured by an atomic force microscope (Atomic Force Microscope: AFM). As FIG. 6 shows the cross-section of the arrangement thereof, a width $w_1$ of a bottom portion of the whole of the convex portion having a stepped portion comprising the first and second groove patterns 58 and 59 was nearly 720 nm, a width $w_2$ of a bottom portion comprising only the first groove pattern 58 was nearly 360 nm, the upper width of the first groove pattern 58, i.e., a width $w_3$ of the top portion was nearly 260 nm, a width $w_4$ of the flat portion of the second groove pattern 59 was nearly 120 nm, and further a width $w_5$ of the bottom portion of the land pattern 60 corresponding to the land was nearly 280 nm.

Next, an optical recording and reproducing medium for evaluation, i.e., the concave and convex pattern formed on the signal forming surface of the above stamper was transferred to the substrate of the optical recording and reproducing medium by 2P method or other suitable method such as injection molding. In this inventive example, there was molded the optical recording and reproducing medium substrate made of PC by the 2P method.

The thickness of the substrate was selected to be 1.2 mm, and the respective layers 5 to 9 were deposited on the signal forming surface with the concave and convex pattern formed thereon as had been described hereinbefore with reference to FIG. 1. In this inventive example, an $SiO_2$ dielectric material such as $Al_2O_3$, $SiO_2$ and $Si_3N_4$ was deposited on the signal forming surface as the dielectric layer 5, a magneto-optical film of GdFeCo, TbFeCo or the like, which is a magneto-optical material used in MD Data2 or the like, was deposited on the signal forming surface as the recording layer 6, the dielectric layer 7 made of a suitable material such as $SiO_2$ and the reflecting layer 8 made of a suitable material such as Al were deposited on the signal forming surface by sputtering, in that order. Further, the protective layer 9 made of a suitable material such as an ultraviolet-curing resin was coated on the reflecting layer and then cured. According to the above-mentioned process, there was formed the optical recording and reproducing medium having the MD Data2 type arrangement.

Figures 7, 8:
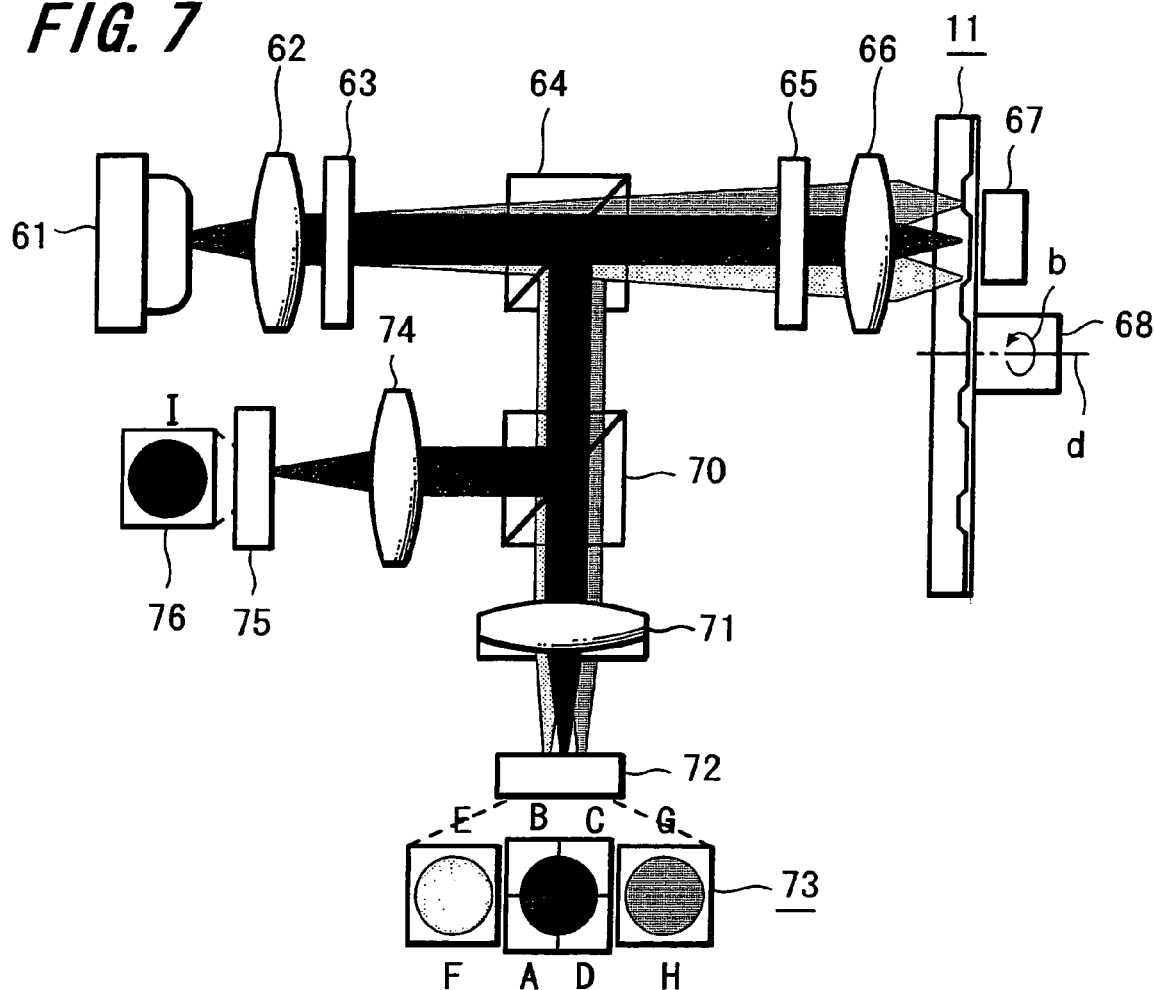
FIG. 7 is a diagram to which reference will be made in explaining an arrangement of an example of the optical recording and reproducing apparatus.
FIG. 8 is a plan view useful for explaining a main portion of an example of the optical recording and reproducing medium.

Reproducing characteristics of the concave and convex pattern of the optical recording and reproducing medium that had been formed as described above were evaluated by the optical recording and reproducing apparatus including the optical system in which the wavelength $\lambda$ was 650 nm and the numerical aperture NA was 0.52. FIG. 7 shows a schematic arrangement of this optical recording and reproducing apparatus.

In FIG. 7, reference numeral 61 designates a light source such as a semiconductor laser having a wavelength $\lambda=650$ nm. The laser beam emitted from this light source is collimated as collimated light by the collimator lens 62 and is divided by the grating 63 and thereby provided as three beams of zero-th order light (main beam) and ±first-order lights (sub-beams). These three beams (P-polarized lights) are passed through a polarizing beam splitter (PBS) 64 and a quarter-wave plate 65 as circularly-polarized light and focused on a predetermined recording track of the optical recording and reproducing medium 11 by an optical pickup 66 composed of an objective lens having a numerical aperture NA=0.85. The center spot of the main beam is used to record and reproduce recording information, and light spots of the sub-beams are used to detect a tracking error.

In FIG. 7, reference numeral 67 designates a magnetic head for use in recording information, for example, and reference numeral 68 designates a rotation means for rotating the optical recording and reproducing medium 11 as shown by an arrow b. A solid-line d designates a rotation axis of the optical recording and reproducing medium 11.

Then, after the reflected light from the optical recording and reproducing medium 11 has been passed through the optical pickup 66 and the quarter-wave plate 65 one more time, circularly-polarized light is changed into S-polarized light, this polarized light is reflected on the polarizing beam splitter 64 and thereby introduced into the polarizing beam splitter 70. The polarizing beam splitter 70 polarizes and separates the incident laser light to provide an S-polarized light component and a P-polarized light component and thereby laser light is introduced into a combined lens 71 and a lens 74.

The laser light incident on the combined lens 71 is introduced through an astigmatism lens, which gives astigmatism to the laser beam, into the photodiode 72 and thereby converted into an electrical signal corresponding to intensity of laser beam. This electrical signal is outputted to a servo circuit as a servo signal, i.e., a focus error signal and a tracking error signal. The photodiode 72 includes separated detectors 73 (A to H). Returned light of the main beam is introduced into the quadrant detectors A to D located at the central portion of the detector 73, and returned lights of the sub-beams are introduced into the quadrant detectors E to H located at both side portions of the detector 73.

The laser light reflected on the polarizing beam splitter 70 is introduced through the lens 74 into another photodiode 75. The photodiode 75 includes a detector 76 (I) to detect laser light that had been reflected on the polarizing beam splitter 70.

In this inventive example, the tracking servo signal was obtained by a differential push-pull (DPP: Differential Push-Pull) system using three laser lights irradiated at a predetermined interval.

Specifically, this optical recording and reproducing apparatus has the arrangement in which a predetermined circuit system adds or subtracts the signals A to I, outputted from the detectors A to I of the respective photo-detectors 73, 76, to output predetermined signals as follows, although not shown. That is, A reproduced signal (MO signal) of the optical recording and reproducing medium $=(A+B+C+D)-I$ A pit reproduced signal (e.g. EFM signal)

$=(A+B+C+D)$ or $I$

A push-pull signal$=(B+C)-(A+D)$

A differential push-pull (tracking servo) signal $=(B+C)-(A+D)-k((E-F)+(G-H))$ (k is a predetermined constant)

Moreover, upon seeking, the polarity of the push-pull signal is detected, and if it is detected that the polarity of the push-pull signal is slanting downwardly in the right-hand side, i.e. in the negative (−) direction, then the magnetic head seeks and tracks the first groove. If on the other hand it is detected that the polarity of the push-pull signal is slanting upwardly in the right-hand side, i.e. in the positive (+) direction, then the magnetic head may seek and track the land. In this inventive example, the recording areas were formed on the bottom portion of the first groove and the land, and the magnetic head tracked the magneto-optical recording layers of the two recording areas.

The optical recording and reproducing medium having the above arrangement according to the present invention was evaluated by the optical recording and reproducing apparatus having the above arrangement.

In the following inventive examples, optical recording and reproducing mediums were produced while the depths of the first and second grooves were being changed. Then, changes relative to the depths of the respective grooves were evaluated by measuring push-pull signal amounts and CTS (cross-track) signal amounts of the respective mediums. While the CTS signal is not used as the tracking servo signal in the inventive example, it is shown for the sake of reference.

In each inventive example, the phase depths are changed from the depths of the respective grooves and shown on the following tables 2 to 7. In this inventive example, as described above, the wavelength $\lambda$ of the optical pickup is 650 nm, the medium extending from the light incident side to the recording area is the substrate made of PC, and the refractive index n of this medium is 1.58. The phase depth x is changed from the depth d as $x=\lambda/(d\cdot n)=650/(1.58d)$.

TABLE 2

| | | | |
|---|---|---|---|
| Depth of first groove [nm] | | 103 | |
| Phase depth of first groove | | $\lambda/4$ | |
| Depth of second groove [nm] | 26 | 52 | 78 |
| Phase depth of second groove | $\lambda/16$ | $\lambda/8$ | $3\lambda/16$ |
| Push-pull signal amount | 0.252 | 0.332 | 0.252 |
| CTS signal amount | 0.206 | 0 | −0.206 |

TABLE 3

| Depth of first groove [nm] | | 52 | |
|---|---|---|---|
| Phase depth of first groove | | $\lambda/8$ | |
| Depth of second groove [nm] | 13 | 26 | 49 |
| Phase depth of second groove | $\lambda/32$ | $\lambda/16$ | $3\lambda/32$ |
| Push-pull signal amount | 0.238 | 0.254 | 0.238 |
| CTS signal amount | 0.077 | 0 | −0.077 |

TABLE 4

| Depth of first groove [nm] | | 26 | |
|---|---|---|---|
| Phase depth of first groove | | $\lambda/16$ | |
| Depth of second groove [nm] | 6.5 | 13 | 19.5 |
| Phase depth of second groove | $\lambda/64$ | $\lambda/32$ | $3\lambda/64$ |
| Push-pull signal amount | 0.278 | 0.282 | 0.278 |
| CTS signal amount | 0.021 | 0 | −0.021 |

TABLE 5

| Depth of first groove [nm] | | 13 | |
|---|---|---|---|
| Phase depth of first groove | | $\lambda/32$ | |
| Depth of second groove [nm] | 3.3 | 6.5 | 9.8 |
| Phase depth of second groove | $\lambda/128$ | $\lambda/64$ | $3\lambda/128$ |
| Push-pull signal amount | 0.148 | 0.148 | 0.148 |
| CTS signal amount | 0.006 | 0 | −0.006 |

TABLE 6

| Depth of first groove [nm] | | 118 | |
|---|---|---|---|
| Phase depth of first groove | | $\lambda/3.5$ | |
| Depth of second groove [nm] | 44 | 59 | 74 |
| Phase depth of second groove | $3\lambda/28$ | $\lambda/7$ | $5\lambda/28$ |
| Push-pull signal amount | 0.2 | 0.226 | 0.2 |
| CTS signal amount | 0.124 | 0 | −0.124 |

TABLE 7

| Depth of first groove [nm] | 127 | |
|---|---|---|
| Phase depth of first groove | $\lambda/3.23$ | |
| Depth of second groove [nm] | 59 | 69 |
| Phase depth of second groove | $\lambda/7$ | $\lambda/6$ |
| Push-pull signal amount | 0.152 | 0.152 |
| CTS signal amount | 0.041 | −0.041 |

As described above, when the depth of the first groove was selected in a range of from 13 nm to 127 nm, i.e. the phase depth is selected to be larger than $\lambda/32n$ and smaller than $\lambda/3.23$ and the depth of the second groove is shallower than that of the first groove, the push-pull signal amount of more than 0.15 could be obtained, and hence a stable tracking servo characteristic could be obtained.

Upon seeking, the polarity of the push-pull signal was detected as described above. If it is detected that the polarity of the push-pull signal is slanting downwardly in the right-hand side, i.e. in the negative direction (−), then the magnetic head could seek and track the first groove. If on the other hand it is detected that the polarity of the push-pull signal is slanting upwardly in the right-hand side, i.e. in the positive direction (+), then the magnetic head could seek and track the land properly. Specifically, when the polarity of the push-pull signal is detected, the magnetic head could stably and easily track the first groove and the land that are the recording areas.

Further, in the respective optical recording and reproducing mediums having the above-mentioned arrangements, if the ADIP signal with the frequency of 84.6 kHz obtained when the first groove was wobbled by the wobbling signal with the amplitudes of ±10 nm was recorded and the stable tracking servo was carried out, then there could be obtained satisfactory characteristics for reproducing the ADIP signal.

As described above, according to the present invention, since the relatively shallow second grooves are provided at both sides of the relatively deep first groove, i.e., the relatively shallow second grooves are provided adjacent to the relatively deep first groove in the radius direction of the optical recording and reproducing medium, information could be recorded on both recording areas of the land and the groove. At the same time, even when the track pitch is reduced to approximately 0.5 μm, i.e., the track pitch is made narrower than the track pitch ($\lambda/2NA=625$ nm) corresponding to the cut-off frequency that is prescribed by the wavelength of the reproducing light and the numerical aperture of the optical pickup of the optical system, the tracking servo could be carried out stably, and the ADIP signal that had been recorded on the first groove as the wobbling signal could be reproduced satisfactorily.

As described above, since the optical recording and reproducing medium according to the present invention has the arrangement in which the substrate is composed of the deep groove and the relatively shallow grooves located at both sides of the deep groove, when the substrate made of a suitable material such as a resin is molded from a stamper, the resin can easily be released from the stamper. Hence, yield and productivity of the optical recording and reproducing medium can reliably be avoided from being lowered due to the protrusions produced in the land when the shape of the concave and convex pattern is transferred to the substrate of the optical recording and reproducing medium.

While the embodiment and the inventive examples having the arrangements according to the present invention have been described so far, the present invention is not limited to those embodiment and inventive examples, and the present invention can of course be variously modified and changed based upon the technical idea of the present invention. The optical recording and reproducing medium is not limited to the information recording and reproducing medium and can be applied to a signal recording and reproducing medium. Alternatively, the optical recording and reproducing medium can be applied to an apparatus using this signal recording and reproducing medium.

As described above, since the optical recording and reproducing medium according to the present invention has the arrangement comprising the first and second grooves, in particular, the relatively shallow second grooves are provided adjacent to both sides of the relatively deep first groove, there could be obtained the sufficiently large push-pull signal amplitude amount.

As a consequence, since the land and the first groove can be reduced in width even when the optical recording and reproducing medium is of the so-called land-groove recording system in which the recording areas are provided on both of the land and the groove, it is possible to provide the high-density recording optical recording and reproducing medium in which the stable tracking servo can be carried out and in which the recording and reproducing characteristics can be satisfied and the optical recording and reproducing apparatus using this high-density recording optical recording and reproducing medium.

Specifically, it is possible to provide an optical recording and reproducing medium which can obtain satisfactory tracking servo characteristics even when the track pitch is reduced in width as the recording density is increasing.

Further, since the phase depths $x_1$ and $x_2$ of the first and second grooves are set so as to satisfy the following equations:

$$\lambda/32n \leq x_1 \leq \lambda/3.23n$$

$$x_2 < x_1$$

when n assumes the refractive index of the medium extending from the light incident surface to the first and second grooves, the push-pull signal amount could be increased more than 0.15, and hence the stable tracking servo characteristic could be obtained.

Furthermore, since the first groove is formed as the wobbling groove on which the ADIP signal is recorded, the satisfactory recording and reproducing characteristic could be obtained.

Since the track pitch of the first groove in the above-mentioned optical recording and reproducing medium is made narrower than the track pitch corresponding to the cut-off frequency of the light optical system that records and/or reproduces this optical recording and reproducing medium, there could be obtained the satisfactory recording and reproducing characteristic.

Furthermore, according to the optical recording and reproducing medium having the arrangement of the present invention, when the substrate made of the suitable material such as the resin is molded from the stamper, since the resin can easily be released from the stamper, it is possible to reliably avoid yield and productivity of the optical recording and reproducing medium from being lowered due to the protrusions produced in the land when the shape of the concave and convex pattern is transferred to the substrate. Thus, the optical recording and reproducing medium can be manufactured inexpensively.

The invention claimed is:

1. An optical recording and reproducing medium having grooves formed thereon along recording tracks and which is recorded and/or reproduced with irradiation of light having a predetermined wavelength λ, comprising:

a first groove; and a second groove being shallower than said first groove and disposed adjacent to both sides of said first groove, wherein when n represents a refractive index of a medium extending from a light incident surface of said optical recording and reproducing medium to said first and second grooves, phase depths $x_1$ and $x_2$ of said first and second grooves are respectively set so as to satisfy the following equations:

$$\lambda/32n \leq x_1 \leq \lambda/3.23n$$

$$x_2 < x_1.$$

2. An optical recording and reproducing medium according to claim 1, wherein at least said first groove is formed as a wobbling groove.

3. An optical recording and reproducing medium according to claim 1, further comprising:

recording areas formed at a bottom portion of said first groove and at a land portion sandwiched between said second grooves.

4. An optical recording and reproducing medium according to claim 1, wherein said first groove has a track pitch narrower than a track pitch corresponding to a cut-off frequency of an optical system that records and/or reproduces said optical recording and reproducing medium.

5. An optical recording and reproducing medium manufacturing master disc used to manufacture an optical recording and reproducing medium having grooves formed thereon along recording tracks and which is recorded and/or reproduced with irradiation of light having a predetermined wavelength λ, comprising:

a first groove pattern corresponding to a first groove formed on the optical recording and reproducing medium; and a second groove pattern corresponding to a second groove formed on the optical recording and reproducing medium, the second groove being shallower than said first groove and disposed adjacent to both sides of said first groove pattern, wherein when n represents a refractive index of a medium extending from a light incident surface of said optical recording and reproducing medium to said first and second grooves, phase depths $x_1'$ and $x_2'$ of said first and second grooves are respectively set so as to satisfy the following equations:

$$\lambda/32n \leq x_1' \leq \lambda/3.23n$$

$$x_2' < x_1'.$$

6. An optical recording and reproducing medium manufacturing master disc according to claim 5, wherein at least said first groove pattern is formed as a wobbling groove pattern.

7. An optical recording and reproducing medium manufacturing master disc according to claim 5, wherein said first groove has a track pitch narrower than a track pitch corresponding to a cut-off frequency of an optical system that records and/or reproduces said optical recording and reproducing medium.

8. An optical recording and reproducing apparatus using an optical recording and reproducing medium having grooves formed thereon along recording tracks and which is recorded and/or reproduced with irradiation of light having a predetermined wavelength λ, wherein said grooves of said optical recording and reproducing medium includes a first groove and a second groove shallower than said first groove disposed adjacent to both sides of said first groove, and when n represents a refractive index of a medium extending from a light incident surface of said optical recording and reproducing medium to said first and second grooves, phase depths $x_1$ and $x_2$ of said first and second grooves are respectively set so as to satisfy the following equations:

$$\lambda/32n \leq x_1 \leq \lambda/3.23n$$

$$x_2 < x_1.$$

9. An optical recording and reproducing apparatus according to claim 8, wherein at least said first groove of said optical recording and reproducing medium is formed as a wobbling groove.

10. An optical recording and reproducing apparatus according to claim 8, wherein said optical recording and reproducing medium has recording areas formed at a bottom portion of said first groove and at a land portion sandwiched between said second grooves.

11. An optical recording and reproducing apparatus according to claim 8, wherein said first groove has a track pitch narrower than a track pitch corresponding to a cut-off frequency of a modulation transmission function of an optical system that records and/or reproduces said optical recording and reproducing medium.

* * * * *